Dec. 17, 1963
L. S. KUNETKA
3,114,174
MOLD FOR MAKING FLEXIBLE PRINTING
PLATES FOR CORRUGATED BOARD
Filed Sept. 12, 1962
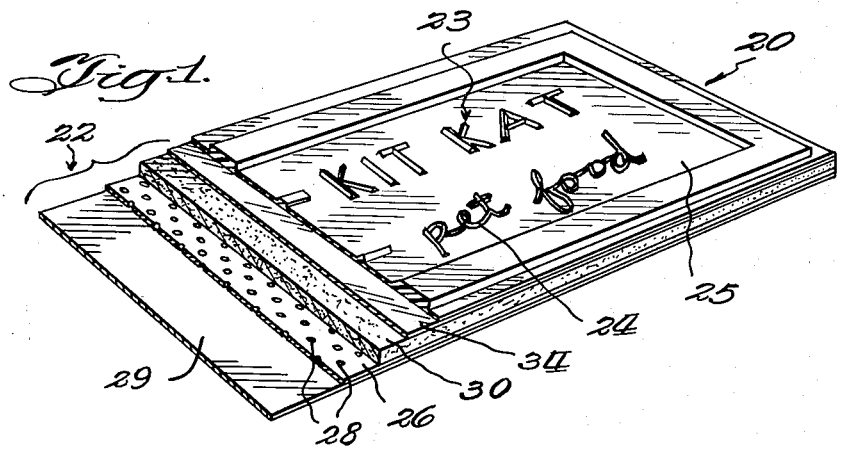
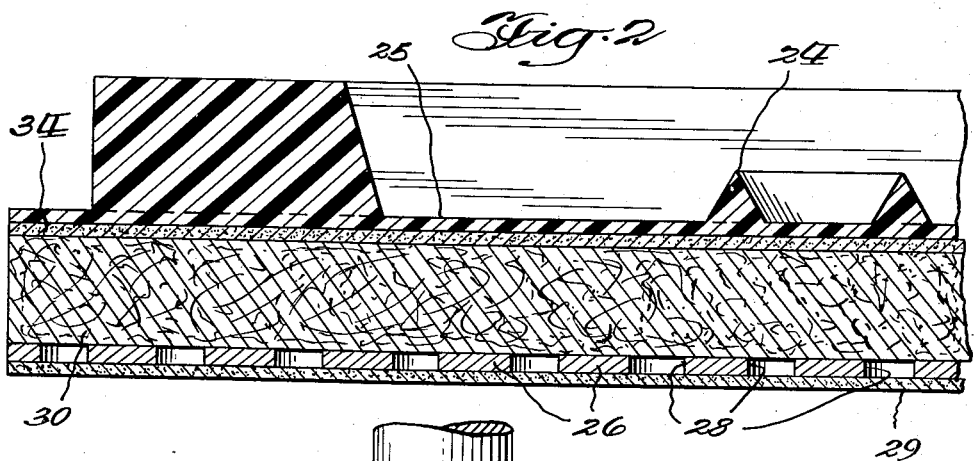
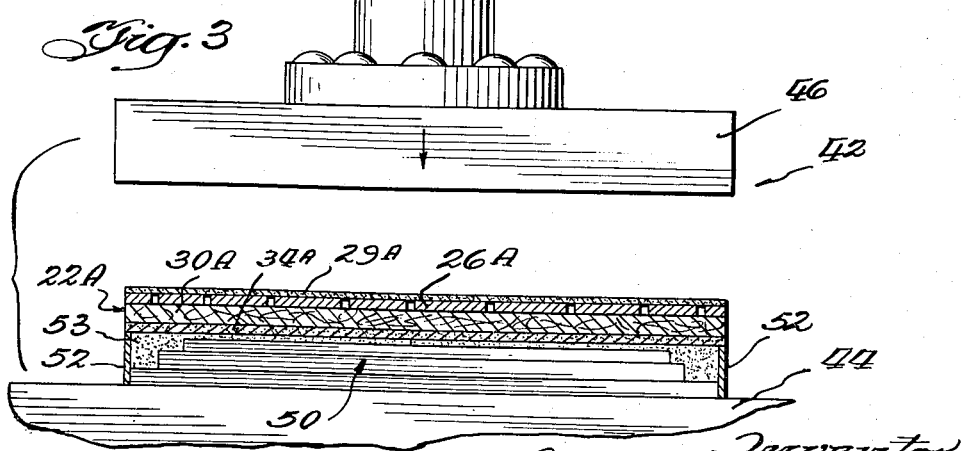
Inventor
Lawrence S. Kunetka
By
Silverman, Mullin, Cass & Kaufman
Attorneys

United States Patent Office 3,114,174
Patented Dec. 17, 1963

3,114,174
MOLD FOR MAKING FLEXIBLE PRINTING PLATES FOR CORRUGATED BOARD
Lawrence S. Kunetka, 900 Lake Shore Drive, Chicago 11, Ill.
Filed Sept. 12, 1962, Ser. No. 223,027
11 Claims. (Cl. 18—44)

This invention relates generally to flexible printing plates for corrugated paperboard or the like and more particularly, is concerned with an improved mold for making rubber printing plates having a novel backing or base structure which enables higher quality rubber printing plates to be made more economically and consistently than heretofore from such molds.

In printing upon corrugated sheet material, it has been customary to make the rubber printing plates having rubber printing surfaces or type face which have been shaped or molded from a previously prepared mold. Initially, in the process of making such a mold from which the rubber plates were to be produced, a hand engraved hard rubber master was made having a work face formed with the graphic representation sought to be reproduced. This face of the master then was layered over with a powdered thermosetting resin. As a backing for the mold, a resin impregnated fibrous board or sheet was placed on top of the granular resin layer. This array of the master, the powdered resin and the backing board then was preheated to coalesce the resin into amorphous or plastic mass and when the resin was sufficiently amorphous, pressure and heat were applied for a predetermined interval of time to cure or set the thermosetting resins to form the desired mold. Thereafter, upon cooling, the master was stripped from the hardened resin to provide a mold from which rubber printing plates then could be pressed or formed. The molds, of course, were intended for repeated use.

Heretofore, the backing board that was employed for making the mold comprised a sheet or panel of fiberboard, asbestos board or similar sheet material that had been impregnated with a solution of a thermosetting resin, usually the same kind of resin as used to cover the master. Many adverse problems arose from use of such a material for the backing board of the mold both in the making of a satisfactory mold and in subsequently making the rubber printing plates therefrom. Generally, such a backing material was highly non-porous since, under heat, the thermosetting resin set throughout its thickness and fused the board material onto the hardened or cured layer of resin. In the subsequent step of forming a printing plate from the mold, the gaseous by-products from the uncured rubber would have no means of escape, as they were being produced under the applied heat and pressure, from the interface of the mold and the rubber print plate. Also, the backing board was rigid and less resilient than even the hard rubber of the master. Thus, the trapped gases would continue to expand, thereby preferentially, deforming the rubber printing face of the printing plate to be made so that said printing surface no longer conformed to the mold, but now had undesirable depressed areas therein. Another problem was the uneven distribution of heat through the thickness of the backing board such that the mold was not uniformly hardened. In some instances, it may not have been sufficiently cured because of poor heat conduction thereto and in still other instances, it may have been overheated so that it was excessively hard and brittle. Accordingly, the mold was structurally weak in these improperly cured areas so that when the master was stripped from the mold, it took with it parts of the mold. In those instances where the heating was rapid or excessive and the resin cured and hardened prematurely, rendering it brittle and unyielding, it frequently cracked when the molding pressures were applied. There was no way of predicting to what extent uneven heating of the resin was occurring. Consequently, there was little the operator could do to possibly compensate for these variables in the mold making process.

Another serious problem that arose from such prior mold making processes was distortion of the mold which was directly attributable to the rigidity and inflexibility of the old type backing structures. This distortion manifested itself in two ways; in the distortion and deformation of the matrix or cavity from which the type faces of the printing plate were formed and in an overall deformation of the rubber plate so that it had a curvature that was concave in the direction of the type face. Considering the conditions under which the mold is formed, it will be realized that the backing structure and master were locked together face to face under heat and pressure. The hard rubber master was more resilient than the backing structure which experienced relatively little or no dimensional change. Consequently, as the assembly was heated, the hard rubber master was deformed preferentially as compared to the backing for the mold; the master was deformed inwardly from the locked edges thereof causing a dishing effect in the center of the mold cavity. The soft resin conformed to this concave surface and therefore, at least the cavity surfaces of the mold were convex. Such a mold provided printing plates that had deformed surfaces, so that subsequent printing therefrom was distorted, or not sharp, was out of register and was substandard. With each successive forming of a rubber printing plate from such a mold, the plate would shrink slightly, so that in the printing of two colors of ink on a corrugated board using such plates, the colors would be out of register.

Accordingly, a major object of this invention is to provide an improved mold of the character described which substantially eliminates the aforementioned disadvantages, as well as others.

An important object of the invention is to provide a mold of the character described having an improved base or backing structure that is dimensionally stable and yet is sufficiently porous to allow the passage of gaseous effluents therethrough and which will permit uniform distribution of heat across its entire surface area and thickness so as to enable high quality rubber plates to be produced from the mold formed therewith.

It is another object of this invention to provide a backing or base structure of the character described for forming said rubber printing plate molds therefrom, said backing structure providing for uniform heat transmission therethrough and having desirable porosity for escape of gaseous effluents produced during the printing plate forming process and dimensional stability to prevent shrinkage of the mold during production thereof.

It is still another object of this invention to provide a multi-layer backing member of the character described comprising a sheet of cellulosic material impregnated with a thermosetting resin and a sheet of perforated metal, said sheets being contained between sheets of a heat resistant paper impregnated with said resin whereby to provide a porous, dimensionally stable, thermal conducting backing member for said mold.

An important object of the invention is to provide a backing structure of the character described for use in making molds for rubber printing plates, said backing structure capable of being pre-formed, supplied and stocked ready for use as needed by rubber printing plate manufacturers without further preparations performed thereto.

Another object of the invention is to provide a mold of the character described having a novel backing structure which enables sharp and accurate type faces to be molded therefrom repeatedly with no damage to the mold.

Other objects of the invention are to provide a mold and a backing structure for a mold for rubber printing plates that are simple and economical to manufacture and which are durable and long lasting and provide consistently high quality rubber printing plates.

With the foregoing and other objects in view which will appear as the description proceeds, the invention consists of certain novel features of construction and arrangement of elements hereinafter fully described, illustrated in the accompanying drawing and particularly pointed out in the appended claims, it being understood that various changes in the form, proportion, size and minor details of the structures may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

In the drawing:

FIG. 1 is a perspective view of a mold with the base or backing structure embodying the invention, portions being broken away to show details.

FIG. 2 is a fragmentary sectional view taken along the line 2—2 of FIG. 1 and in the direction indicated generally.

FIG. 3 is a fragmentary diagrammatic view illustrating a preferred method of forming the mold embodying the invention, portions being in section to show details.

Referring to the drawing, the mold embodying the invention and used to form rubber printing plates is designated generally by the reference character 20. As illustrated in FIG. 1, the mold 20 is comprised of a multi-layer backing structure designated generally of 22 and the cavity or matrix portions designated generally 23. Said portions 23 include solid portions 24 in relief and upstanding on the floor 25 of the mold.

The multi-layer backing structure 22 is comprised of an assemblage of materials each performing a specific function and each having characteristics which combine to provide the backing structure 22 with its unique and improved qualities. As shown in FIGS. 1 and 2, assemblages 22 includes a thin perforated sheet of metal 26. This metal sheet 26 may be made of either ferrous or non-ferrous metals through which has been punched or otherwise formed a plurality of spaced apart holes or openings 28. It will be appreciated that a metal screen also can be utilized as the perforated sheet metal member 26. The perforated metal sheet 26 may be made of steel, copper, brass, nickel or aluminum or any metal that exhibits a good thermal conductivity so that heat will be conducted uniformly across the surface of the mold 20 and through the thickness thereof.

The perforated metal sheet 26 is sandwiched between a sheet of heat resistant paper 29 and a somewhat porous layer 30 of material that is compressible sufficiently such that it can withstand pressures used to make the mold 20, without breaking. The layer 30 is formed of a mixture of a cellulosic material in course granular form, such as sawdust, with a thermosetting resin dissolved in a solvent. The fluid mixture can be spread cold on the metal plate 26 so that upon evaporation of the solvent, a set, matted covering for the perforated metal 26 is obtained. Thus, the perforations 28 in the metal sheet 26 serve not only to permit passage for gaseous materials evolved during forming of the rubber printing plates, but also serve to firmly secure the porous and somewhat resilient layer 30 to the metal sheet 26 by virtue of the material 30 extending through the openings 28.

As shown in FIGS. 1 and 2, the bottom member 29 is comprised of a sheet of heat resistant paper, such as asbestos fiber paper, impregnated with a thermosetting resin. The paper sheet 29 is applied to the opposite side of the perforated metal sheet 26 while still wet with the solvent so that there is still further binding that takes place through the perforations 28 between layers 29 and 30. Although a fourth layer 34 is shown in FIG. 1 that is substantially identical to layer 29, it is not intended that the backing structure be limited thereto. In the circumstance where the layer 30 is sufficiently smooth and uniform, the upper paper layer 34 will not be necessary. Where the type of cellulosic material employed is unduly coarse so that the layer 30 is somewhat fragile and not self retaining, the resin impregnated paper sheet or layer 34 may be required. A multi-layer backing structure can be preassembled ready for use in the final step of making the mold assembly 20, as will be discussed in connection with panel 22A subsequently.

As seen in FIG. 3, the machine in which the mold 20 is formed and which can be used also for forming rubber printing plates, is a conventional hydraulic press designated generally by the reference character 42. The press includes a fixed bed 44 and a movable arm or head portion 46, both usually being equipped with steam lines (not shown) or other suitable means by which to provide an operating range of temperature from 120 degrees to 500 degrees Fahrenheit. With the movable head 46 in a raised position, the hand engraved rubber master 50 is placed on the fixed bed 44 with its work face portions facing upwardly or toward the movable head 46. The master 50 is framed as at 52 with suitable metal slats so as to form a retaining wall around the master 50. The work face of the master 50 is completely covered with a granular layer 53 of thermosetting resin. A backing structure panel 22A that has been made previously as described above, is placed over the resin filled frame 52 after any excess quantities of the thermosetting resin had been removed so that the resin is level with the top edges of the frame 52. The frame 52 extends beyond the work face of master 50 so that a thick layer of resin is heaped on said master.

The backing structure 22A is placed on the frame 52 so that the uncured resin layer 30A is adjacent the powdered resin. In the circumstance where the backing structure 22 includes the fourth layer 34, the paper 34 will be next to the powdered resin 53. At the proper processing temperature of about 310° Fahrenheit, the movable head 46 is lowered against the backing structure panel 22A which then is subject to the preheat temperature of 310° Fahrenheit for a period of about two minutes. The specific temperature may vary within the range of from 150° to 500° Fahrenheit, depending on the type of resin that is used. During the preheat stage, the uncured powdered resin 53 as well as the uncured resin in the backing structure panel 22A is coalesced and forms a molten or amorphous mass. This step in the processing fuses together the resin 53 deposited over the master 50 with the resin in the backing structure panel 22A. The resin contained in the layers of the backing structure on either side of the perforated metal sheet 26 flows through the openings 28 binding the various layers together. In the resulting layer 30, the resin-cellulosic mixture will still retain desirable porosity by virtue of the cellulosic material.

At the conclusion of the preheat cycle, the pressure exerted by the head 46 on the entire assembly is increased to approximately 180 lbs. per square inch. Some of the advantages afforded by the backing structure 22 may be examined appropriately from phenomena occurring during this phase of the processing. The possibility of prematurely applying pressure to the assembly before the resin is sufficiently plastic or flowable is lessened since the resilient, porous layer 30 will yield somewhat under the pressure and not fracture. Not to be overlooked is the effective conduction of heat by the perforated metal sheet 26 both laterally and through the thickness of the backing structure 22 so that all parts thereof are substantially uniformly heated. Hence, a greater latitude obtains as to the permissible range for the processing variables in the making of the mold assembly 20.

The application of about 180 lbs. per square inch pressure under temperatures of about 310° Fahrenheit is sustained for approximately 7 to 10 minutes. The powdered resin which has been coalesced into a flowable mass forms a cavity or matrix in the mold corresponding to the working face of master 50. The porous-resilient layer 30 also is more compressible and pliable than the master 50, thereby yielding preferentially so that sharp formations 24 are formed whose edges are clean and unbroken. The master is stripped away from the assembly at the conclusion of the pressure and heat cycle to yield the mold assembly 20. Referring to FIG. 2, the cavity or matrix 23 of the mold will correspond to the solid portions of the master 50, and the solid portions 24 of the mold 23 correspond to the cavity 52 in the master.

The mold assembly 20, comprising the backing layer 22 fused to the matrix portion 23, may now be employed in a conventional manner to produce a rubber printing plate (not shown) by using the same press 42. Referring to FIG. 3, in place of the master 50, the mold assembly 22 is placed on the fixed bed 44 with the matrix portion 23 facing upwardly or toward the movable head 46. A sheet of uncured rubber (not shown) is placed thereon and the head 46 is lowered, the process thereafter being carried out as a conventional vulcanizing and molding procedure. The layer 30 comprising the porous mixture of cured resin and cellulosic particles provides the minute ducts or pores so that the gases produced during the vulcanization of the uncured rubber may escape therethrough. Where a fourth layer 34 of asbestos fiber paper is employed there will be sufficient porosity in that layer to permit the passage of gases therethrough.

The mold assembly 22 can be used repeatedly to prepare rubber printing plates without fear of shrinkage. The perforated metal plate 26 being fused between the layers 29 and 30 supplies the necessary dimensional stability to the backing structure preventing shrinkage thereof and, consequently, the rubber printing plates formed from the mold assembly 20 will be in register.

It is believed that this invention, its mode of construction and assembly, and many of its advantages should be readily understood from the foregoing without further description and it should also be manifest that while a preferred embodiment of the invention has been shown and described for illustrative purposes, the specific details are nevertheless capable of wide variation within the purview of this invention as defined in the appended claims.

What is claimed and desired to be secured by Letters Patent of the United States is:

1. A mold for making rubber printing plates comprising, a base structure having a matrix for the mold integral with a surface thereof for reproducing type faces on a rubber printing plate molded therefrom, said base structure comprising, a unitary assemblage of a perforated metal sheet, a layer of cellulosic granules cohered together by means of a cured thermosetting resin and a second sheet of heat resistant fibrous material and a cured thermosetting resin, said metal sheet being sandwiched between said layer and second sheet and said layer providing said surface having said matrix thereon.

2. A mold as described in claim 1 in which said metal sheet is perforated over substantially the entire area thereof.

3. A mold as described in claim 1 in which said layer is more resilient in character than the conventional rubber master from which the matrix is produced whereby to enable yielding of the mold relative to said rubber master during formation of the mold under heat and pressure.

4. A mold as described in claim 2 in which said matrix comprises a cured thermosetting resin.

5. A mold as described in claim 2 in which there is a third sheet substantially similar to said second sheet interposed between said matrix and layer.

6. A mold for making rubber printing plates comprising, a base member having a cured thermosetting resin matrix on the upper surface thereof, said base member comprising, a first sheet of perforated metal, a layer of granular material cohesively held together by a cured thermosetting resin and extending through said perforations, and a second, relatively thin sheet of thermosetting resin impregnated pulp material, said first sheet being laminated between said second sheet and layer with said matrix exterior of said layer.

7. A mold as described in claim 6 in which there is a third sheet similar to said second sheet interposed between said matrix and layer and cohered to both of them.

8. In a mold for making rubber printing plates and having a matrix portion for reproducing desired types faces on a printing plate to be molded from said mold, a backing structure for use in making said mold and to support said matrix comprising, a unitary assemblage including a first sheet of perforated metal, a layer of granular cellulosic material held together by a thermosetting resin which is at least partially cured, and a second sheet of a resin impregnated heat resistant fibrous material, said first sheet being interposed between said layer and said second sheet with said second sheet held in place by said layer extending through said perforations.

9. A structure as described in claim 8 in which there is a third sheet similar to said second sheet secured overlying said layer.

10. A structure as described in claim 8 in which said second sheet comprises an asbestos paper.

11. A structure as described in claim 9 in which said second and third sheets comprise asbestos paper.

References Cited in the file of this patent

UNITED STATES PATENTS

| 2,013,949 | Clark | Sept. 10, 1935 |
| 3,075,260 | Stanezak et al. | Jan. 29, 1963 |